April 21, 1936.   W. L. HEALD   2,038,044
METHOD OF AND APPARATUS FOR TESTING DOUGH
Filed Dec. 6, 1935
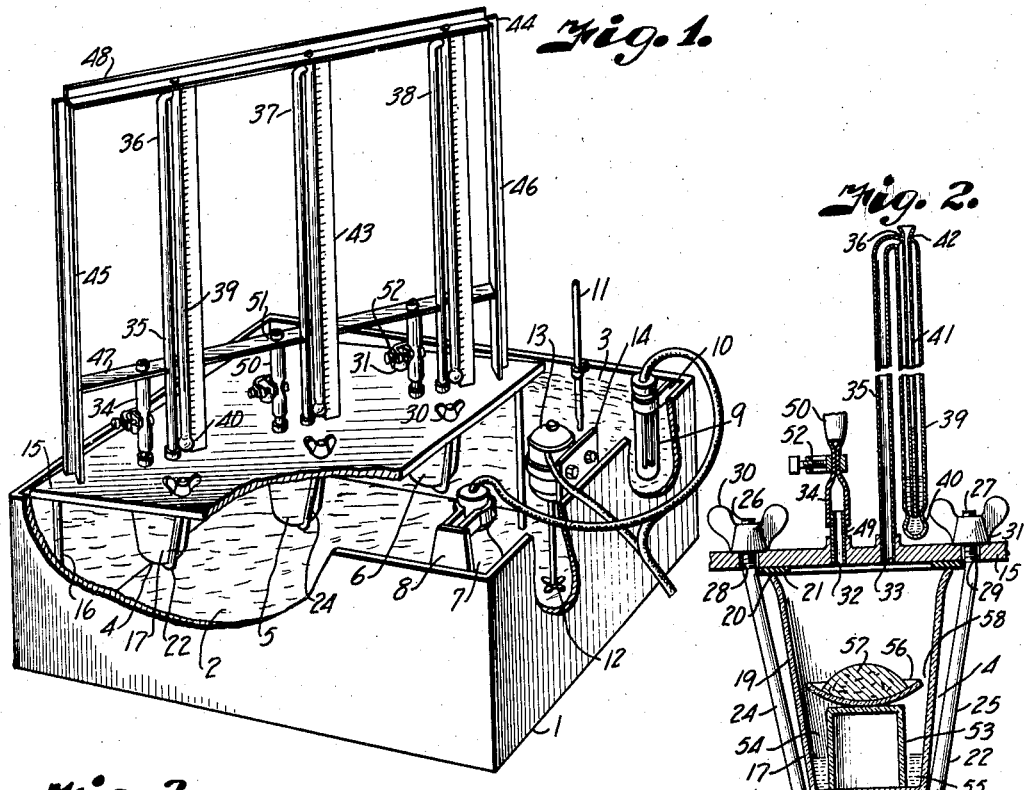
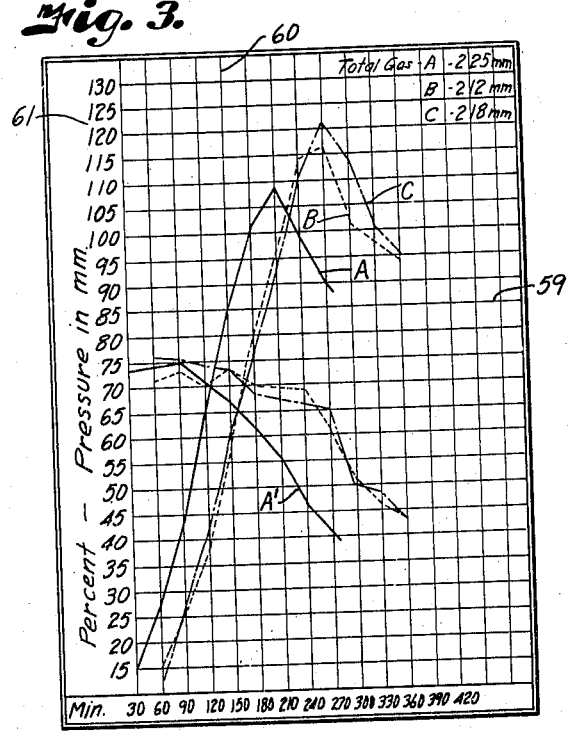
INVENTOR
William L. Heald.
BY
ATTORNEY Patented Apr. 21, 1936

2,038,044

UNITED STATES PATENT OFFICE 2,038,044

METHOD OF AND APPARATUS FOR TESTING DOUGH

William L. Heald, Kansas City, Mo., assignor of one-half to Flour Mills of America, Inc., Kansas City, Mo., a corporation of Maryland Application December 6, 1935, Serial No. 53,215

16 Claims. (Cl. 73—51)

This invention relates to a method of and apparatus for testing dough, and particularly for determining the critical maturing point of a dough batch so that the products produced therefrom will have desired volume, appearance, quality and texture.

As is well known in the preparation of dough mixtures, yeast with its enzymes is introduced into a flour and liquid mixture to effect fermentation wherein quantities of carbon dioxide gas are generated and the hydrogen concentration of the mix is progressively increased to that productive of the desired physical characteristics for good bakery products, as characterized by volume relatively to a given weight of dough, size and arrangement of cell structure, appearance, and keeping qualities. All of these characteristics are dependent upon the gas retention and liberating properties of the dough, which in turn are governed by physical changes brought about with the development and final attainment of a definite hydrogen ion concentration, humidity and temperature of the surrounding air, and other factors. The time required for bringing about the desired fermentation varies with the dough ingredients, and particularly the quality of the yeast. Consequently, it is impossible to determine the critical point merely by timing the maturing period, and heretofore it has been necessary to determine this point by preparing and baking samples of a dough mix, altering the proportions of the ingredients, yeast content, and maturing periods until the desired fermentation point has been determined.

It is, therefore, the principal object of the present invention to provide a positive and accurate method for ascertaining the critical maturity point of a dough mix by determining the ratio of the contained carbon dioxide gas to the total amount of gas evolved during the fermentation period.

In carrying out my invention, I have discovered that the critical point of maturity is reached in the case of straight doughs when the percentage of retained gas reaches approximately 60 per-cent of the total evolved gas, and in the case of sponge doughs when the retained gas is approximately 40 percent of the total volume of evolved gas. In order to determine this ratio, I have provided an improved apparatus and technique whereby the critical maturing point is readily ascertained, as illustrated in the accompanying drawing wherein:

Fig. 1 is a perspective view of an apparatus for practicing my invention, parts of which are broken away to better illustrate the construction thereof.

Fig. 2 is an enlarged vertical section through one of the units of the apparatus wherewith the pressure of the evolved gas is ascertained in millimeters of mercury.

Fig. 3 is a face view of a chart showing graphs of the gas pressure evolved and the per-cent of retained gas pressure in three different dough mixes over definite periods of time.

Fig. 4 is a face view of a chart showing the pressure readings, temperatures, and ratios of the evolved gas.

Referring more in detail to the drawing:

1 designates a tank for containing a body of temperature equalizing liquid 2, and having an open top 3 wherethrough a plurality of dough sample testers 4, 5 and 6 are inserted for immersion in the liquid so that the samples may be maintained at a definite mean temperature. The body of liquid is heated to maintain the desired temperature by a suitable heater, for example an electric light bulb 7, that is suspended in the liquid by means of a bracket 8 fixed to one of the walls of the tank, as clearly shown in Fig. 1. The heater 7 is energized under the control of a thermostat 9, which is also suspended in the liquid at an opposite side of the tank on a bracket 10, to maintain a definite mean temperature at which the thermostat may be set. The tank is also provided with a thermometer 11 for indicating the temperature of the liquid as maintained by the heater. In order to maintain uniform temperature throughout the entire body of liquid, the tank is preferably provided with an agitator 12 that is operated by a suitable motor 13 supported above the liquid on a bracket 14 that is also carried by one of the tank walls.

The sample testing units 4, 5 and 6 are carried by a plate 15 that is supported in substantially horizontal alignment with the open top of the tank by means of legs 16 engaging the bottom of the tank. The units 4, 5 and 6 are shown as arranged in a row extending diagonally across the plate 15, and each of which includes a container 17, preferably formed of transparent material such as glass. In fact, the containers 17 may be ordinary drinking glasses having flat bottoms 18 and annular flaring side walls 19 terminating in rims 20 that are adapted to seat against gasket rings 21 engaging the bottom face of the plate 15.

The containers are secured in gas-tight engagement with the gasket rings 21 and the gasket rings against the bottom face of the plate 15 by stirrups 22. The stirrups 22 are preferably formed of substantially U-shaped rods having horizontal bar portions 23 extending across the bottom 18 of the containers and upwardly diverging arms 24 and 25 having threaded ends 26 and 27 extending through holes 28 and 29 in the plate 15.

Threaded on the projecting ends of the arms are wing nuts 30 and 31 to effect sealing pressure when they are drawn tightly against the upper face of the plate. Formed in the plate in registry with each of the containers are ports 32 and 33 to respectively connect pressure release conduits 34 and legs 35 of manometers 36, 37 and 38 for the respective testers 4, 5 and 6. The legs 35 are sealingly engaged in the ports 33 and connect at their upper ends with depending legs 39 having mercury wells 40 in their lower ends.

Located concentrically within the legs 39 are open end tubes 41 having their lower ends immersed in the mercury and their upper ends projecting from and sealed within the legs 39, as at 42. Located coextensively with each of the legs 39 are scales 43 whereby the heights of mercury in the tubes 41 are read in millimeters, as in conventional manometer practice. The manometers are supported in vertical position relatively to the plate 15 by means of a frame 44 including vertical legs 45 and 46 that are located at the corner of the plate 15 in line with the containers and cross bars 47 and 48, the manometers being connected to the cross bars in any conventional manner.

The pressure release conduits may include nipples 49 sealed within the ports 32, and flexible tubes 50 fixed to the upper ends of the tubes. The tubes 50 have their upper ends extending through openings 51 in the cross bar 47 to support them in upright position as shown in Fig. 1. The tubes are adapted to be valved by means of pinch clamps 52 to selectively retain generated gas within the respective containers.

Located in each container, and resting on the bottom thereof, are stands 53 of smaller diameter than the container to provide an annular chamber 54 for containing a chemical solution 55 later described. The upper ends of the stands support dishes 56 in which samples of dough 57 are placed, the dishes 56 being of smaller diameter than the glasses to provide passageways 58 about the peripheries thereof, for a purpose later described.

The chart illustrated in Fig. 3 includes spaced series of horizontal lines 59, crossed by parallel vertical lines 60 to form a site on which pressure graphs of the respective samples are drawn. Provided at the left side of the chart in arithmetical progression of fives, is column 61 of figures from 15 to 130 respectively designating the horizontal lines of the chart as representing percentage pressures and pressures in millimeters of mercury. At the lower end of the chart are numerals respectively designating the vertical lines to represent thirty minute periods of time.

The chart illustrated in Fig. 4 includes laterally arranged vertical columns 62, 63, 64, 65, 66, 67, 68, 69 and 70, crossed by transverse lines 71 to form squares in which the results of tests are recorded. The column 62 designates time of maturity and the squares are marked to indicate thirty minute time periods arranged in arithmetical progression from the top toward the bottom of the column. The heads of columns 63, 64 and 65 are designated to represent pressures in the respective containers 1, 2 and 3 in millimeters of mercury, column 66 temperature, column 67 the average increase in pressures of samples 1 and 3, column 68 the increase in pressure of sample 2, column 69 the average pressure generated by samples 1 and 3, and column 70 the percentage of the retained pressure relatively to the total evolved pressure, respectively.

In taking a sample from a dough batch, it is difficult to obtain a single sample that is truly representative of the gas retaining properties of the batch owing to variation in surface extent of the sample in proportion to its weight relatively to the main batch of dough. Slight crusting over of the samples or variation in the cell structures also affect gas retention properties of the sample. It is, therefore, desirable to take a plurality of samples under as nearly the same conditions as possible and to record the mean results as being representative of the entire dough batch. This is particularly the case in the samples that are to be used in determining the percentage of the retained gas relative to the total evolved gas.

I have found that substantially accurate results can be obtained regarding the retained gas pressure by using the mean results of two samples, but only one sample is needed in determining the total evolved gas pressure. After preparing a dough batch, I therefore take three samples of equal weight and of as nearly the same shape and texture as possible, and place them on the dishes in the containers 4, 5 and 6 respectively. In order to accurately determine the pressure of the retained gas it is necessary to effect maturing of the dough in air having substantially 80 per-cent humidity, and to maintain this humidity I place an aqueous chemical solution within the respective testers 4, 5 and 6 as above referred to. The solution employed in the tester 5, which is used for determining the total amount of gas pressure evolved, is preferably a 25 per-cent solution of sodium chloride, the sodium chloride preventing the gas from being absorbed by the solution. The testers 4 and 6, however, are to be used in ascertaining the pressure of the retained gas, and for this reason it is necessary that the solutions contained therein be such as to absorb the liberated carbon dioxide gas so that the pressure acting upon the manometer is only that incidental to the actual expansion of the dough sample. For this solution I may employ a 25 per-cent solution of potassium hydroxide. The potassium hydroxide not only retains the desired 80 per-cent humidity but also effectively dissolves the liberated gas.

The thermostat 10 is set to maintain the temperature of the liquid in the tank 1 at substantially the mean temperature of the dough batch so that the fermentation of the samples will take place at substantially the same rate as the batch.

After the dough samples and chemical solutions have been inserted in the containers, the containers are clamped against the gaskets and retained by the stirrups so as to effect a gas-tight joint. The pinch clamps are then loosened to insure that the interiors of all the containers stay at atmospheric pressure until just prior to the time fermentation begins. After the tubes have been open for a sufficient period, the pinch clamps are reapplied so that the pressure, evolved because of fermentation, acts upon the mercury in the manometers. As fermentation progresses, pressures increase in the respective containers to raise the levels of mercury within the inner tubes so that the pressure variations are readable on the respective scales. During the first thirty minutes substantially no change occurs in pressure, however at the end of this period the temperature of the main dough batch is taken and entered in the first space of the column 66, for example 78.3 degrees. At the end of the next thirty minute period the pressures as indicated by the respective manometers are taken and entered in the columns 63, 64 and 65, for example 27, 37 and 28 millimeters of mercury. The temperature of the dough batch is again noted and entered in the column 66 below the first temperature recording. The average increase in pressure between samples 1 and 3 is then calculated as 27.5 and is entered in column 67. The increase in pressure of the sample 2 is entered in column 68 as 37 millimeters, and the average pressure of samples 1 and 3 is recorded in column 69 as 27.5 millimeters of mercury. The ratio of the average pressure in the samples 1 and 3 in testers 4 and 6 relatively to the pressure of the sample 2 in tester 5 is calculated and entered in the column 70 as 74.3 per-cent.

At the end of each thirty minute period similar recordings are taken and entered on the chart in the same manner as described at the end of the sixty minute period. A graph, for example A, may then be drawn on the chart illustrated in Fig. 3, using the average millimeter pressure of the retained gas at the end of the respective time periods to compare the rise in pressure of the sample of one dough batch with samples taken from another dough batch, for example as indicated by the graphs B and C which are representative of different mixtures or different brands of yeast.

The percentages as taken from the last column 70 may be used to draw a graph A' to graphically indicate the percentage of retained gas pressure in the dough at the various thirty minute periods. It will be noted that the pressure of the retained gas drops in value as the maturing or fermentation period progresses and I have found that when the retained gas drops to 40 per-cent of the total evolved gas in sponge dough, the critical maturity point is reached and the dough is ready for baking.

I have also indicated on the chart illustrated in Fig. 3 the percentage graphs of two other dough mixtures employing different yeast materials. In these samples the percentage of retained gas has not reached the 40 per-cent value at the end of the three hundred sixty minute period, which would indicate that a greater amount of yeast is needed, or other variation in the mix, in order that the retained gas will arrive at the proper percentage in a shorter time interval, because it is desirable in bake shop practice that the dough reach the maturity point in as short a time as possible.

From the foregoing it is apparent that I have provided improved apparatus and method for accurately determining the critical maturity point for a dough batch, and by comparing graphs made from the respective recordings I am enabled to compare the pressure and action of the evolved gas during the fermentation period so that the ingredients may be altered to bring the maturing point to as nearly the correct value as possible in a short time.

What I claim and desire to secure by Letters Patent is:

1. The method of determining the maturity point in a dough mix including, determining the total pressures of the gas evolved in a sample taken from the dough mix, determining the pressures of the retained gas in a similar sample from the dough mix, and calculating the ratio of the evolved gas to the retained gas at selected time intervals.

2. The method of determining the maturity point in a dough mix including, determining the total pressures of the gas evolved in a sample taken from the dough mix, determining the pressures of the retained gas in a similar sample from the dough mix, calculating the ratio of the evolved gas to the retained gas at selected time intervals, and maintaining the samples under similar temperature and moisture conditions.

3. The method of determining the maturity point in a dough mix including, determining the total pressures of the gas evolved in a sample taken from the dough mix, determining the pressures of the retained gas in a similar sample from the dough mix, and taking said pressures at selected time intervals until the ratio between the total evolved gas pressure and the retained gas pressure reaches a predetermined value.

4. The method of determining the maturity point in a sponge dough mix including, determining the total pressures of the gas evolved in a sample taken from the dough mix, determining the pressures of the retained gas in a similar sample, and taking said pressures at selected time intervals until the retained gas pressure reaches substantially 40% of the total evolved pressure.

5. The method of determining the maturity point in a yeast leavened dough including, confining dough in a closed container, absorbing the gas liberated from the dough incidental to fermentation, and measuring pressure generated in the container incidental to increase in volume of the dough.

6. The method of determining the maturity point in a yeast leavened dough including, confining dough in a closed container, absorbing the gas liberated from the dough incidental to fermentation, and measuring pressure generated in the container incidental to increase in volume of the dough at selected time periods.

7. The method of determining the maturity point in a yeast leavened dough including, confining dough in a closed container, absorbing the gas liberated from the dough incidental to fermentation, measuring pressure generated in the container incidental to increase in volume of the dough, ascertaining the pressure generated by the total evolved gas in a similar amount of like dough, and comparing said pressures at selected periods until the ratio of said pressures equals a predetermined ratio.

8. The method of determining the maturity point in a yeast leavened dough including, confining dough in a closed container, absorbing the gas liberated from the dough incidental to fermentation, measuring pressure generated in the container incidental to increase in volume of the dough, ascertaining the pressure generated by the total evolved gas in a similar amount of like dough, comparing said pressures at selected periods until the ratio of said pressures equals a predetermined ratio, and maintaining said doughs under the same moisture and temperature conditions.

9. The method of determining the maturity point in a yeast leavened dough during fermentation, including measuring the increase in volume of the dough, and comparing said increase with the total evolved gas generated incidental to fermentation.

10. The method of determining the critical maturity point of a yeast leavened dough batch including determining the pressure ratio of the gas evolved incidental to fermentation to the gas retained in said dough.

11. The method of determining the critical maturity point of a yeast leavened dough batch, including removing samples of the dough batch for fermentation simultaneously with the main batch, maintaining the samples at substantially the mean temperature of the main dough batch, and determining the percentage of retained gas in one sample relatively to the total gas evolved in another of said samples.

12. An apparatus for determining the maturity point in a dough mix including, a plurality of closed containers for confining dough samples under pressure of the gases evolved incidental to fermentation of the dough, means in said containers for maintaining the same free moisture content in the containers including means for absorbing the free gas liberated from one of the samples, and means connected with the containers for recording the pressures in said containers.

13. An apparatus for determining the maturity point in a dough mix including, a plurality of closed containers for confining dough samples under pressure of the gases evolved incidental to fermentation of the dough, means in said containers for maintaining the same free moisture content in the containers including means for absorbing the free gas liberated from one of the samples, means connected with the containers for recording the pressures in said containers, and means for retaining the dough samples at the same temperature.

14. In an apparatus for determining the maturity point in a yeast leavened dough mix including, a closed container for confining a dough sample, means in said container for absorbing the free gas liberated from the sample, and means connected with the container for recording the pressure in said container effected incidental to expansion of the dough by the retained gas.

15. In an apparatus for determining the maturity point in a yeast leavened dough mix including, a closed container for confining a dough sample, means in said container for absorbing the free gas liberated from the sample, means connected with the container for recording the pressure in said container, and means for retaining the dough sample at the same temperature as the dough mix.

16. The method of determining the maturity point in a straight dough mix including, determining the total pressures of the gas evolved in a sample taken from the dough mix, determining the pressures of the retained gas in a similar sample, and taking said pressures at selected time intervals until the retained gas pressure reaches substantially 60% of the total evolved pressure.

WILLIAM L. HEALD.